United States Patent [19]
Beckham

[11] Patent Number: 5,628,178
[45] Date of Patent: May 13, 1997

[54] SPROCKET CHAIN MASTER LINK

[76] Inventor: Russell K. Beckham, 2888 Old Gilliard Rd., Holly Hill, S.C. 29059

[21] Appl. No.: 678,520

[22] Filed: Jul. 9, 1996

[51] Int. Cl.[6] ................................................. F16G 15/04
[52] U.S. Cl. ............................................ 59/86; 59/93
[58] Field of Search ................................. 59/78, 85, 86, 59/93

[56] References Cited

U.S. PATENT DOCUMENTS

| | | | |
|---|---|---|---|
| 340,838 | 4/1886 | Walters et al. | 59/86 |
| 1,380,903 | 6/1921 | Haughtwout | 59/85 |
| 1,392,138 | 9/1921 | Freeman | 59/86 |
| 3,817,028 | 6/1974 | Blackwood | 59/86 |
| 3,962,811 | 6/1976 | Buschini et al. | 59/86 |
| 4,095,416 | 6/1978 | Issard | 59/86 |

*Primary Examiner*—David Jones
*Attorney, Agent, or Firm*—Dallis Law Firm, P.A.

[57] ABSTRACT

A sprocket chain link designed to connect opposing link ends of a handwheel sprocket chain having a detachable grasping end and a detachable bit end. The sprocket chain master link is used to facilitate replacement or length alterations an existing handwheel sprocket chain used to turn a sprocket handwheel for opening and shutting piping valves. The detachable grasping end of the sprocket chain master link is used to hold a link end portion of a standard handwheel sprocket chain link while the detachable bit end of the sprocket chain master link holds the loop end of a standard handwheel sprocket chain link. While attached to a handwheel sprocket chain, the sprocket chain master link rotates around a handwheel sprocket performing the same function as the attached standard handwheel sprocket chain links.

5 Claims, 3 Drawing Sheets

SPROCKET CHAIN MASTER LINK

BACKGROUND OF THE INVENTION

1. Field of the Invention

The present invention relates to the field of chain linking and, more particularly, to a sprocket chain master link used for coupling the ends of a handwheel chain common in the piping industry.

2. Description of the Related Art

The manufacturing and processing industries often use various diameter pipes and conduits to transport fluid materials from one location to another. Effective control and regulation of the transport of such fluids through the use of valves is of paramount importance in these industries. Although many pipe valve operations are automated, many various types of valves can be opened and closed manually by turning a handwheel attached to the valve. It is often the case, however, that these handwheels and associated valves may be difficult to access because they are located overhead or out of reach.

In order to allow operators to manipulate handwheels located overhead or out of reach, handwheels are designed with sprocket wheels having protruding teeth. A sprocket chain can be secured around the sprocket wheel with the individual sprocket links resting on the protruding teeth of the wheel. The actual length of the chain varies depending upon the distance of the wheel to the ground surface. By pulling on the chain, an operator can manually open or close the valve.

Installing or replacing sprocket chains can be a difficult task. It is necessary to clamp one end of the multiple links in a vise or with a type of locking pliers to hold the link securely while using another type of pliers to unwind the tail ends of the link which wrap back around themselves. After inserting the link from the other end of the chain into the disassembled link, the pried apart tail ends of the disassembled link must be placed back in their original position. It is not unusual to break the tail ends off when trying to open or close the individual links when being disassembled. When this occurs, the operator must try again to pull apart another link. An effective solution for the problems relating to installation and replacement of sprocket chain links for handwheels is a master link that can be quickly and effectively inserted or removed from the chain.

The prior art relating to sprocket chain master links or universal chain links does not appear to address the type of sprocket links used in the piping industry. U.S. Pat. No. 4,882,901 to James M. Lapeyre relates to a detachable link chain used as a conveyor or transmission chain. The Lapeyre patent describes a chain composed of a plurality of interconnected identical links which are attachable and detachable without need for pivot pins or other separate connecting hardware. These chain links, however, are quite distinct from the types of sprocket links used in the piping industry.

The existing prior art does not appear to address the problems associated with the difficulties in installing or replacing sprocket chain links used for handwheels. The present invention is specifically designed to facilitate the connecting and disconnecting of sprocket chains from handwheel sprockets. By using a master link that can be quickly detached and re-attached to an existing chain, such operation can save time and energy installing or replacing a sprocket chain.

SUMMARY OF THE INVENTION

It is therefore an objective of this invention to provide an effective and efficient means for installing or replacing sprocket chains used to turn valve handwheel common in the piping industry.

It is further an objective of this invention to provide a sprocket chain master link that can be easily disengaged at both the tail end of the link as well as the forward end of the link.

It is still further an objective of this invention to provide a sprocket chain master link that operation the same as a standard handwheel sprocket chain link by allowing for rotational flexibility at both linkage ends of the sprocket chain master link when the handwheel sprocket chain link is circumventing the arced perimeter of a sprocket handwheel.

These as well as other objectives are accomplished by a sprocket chain master link having a shackle member with a detachable grasping end and a detachable bit end. The sprocket chain master link is used to facilitate replacement or length alterations an existing handwheel sprocket chain used to turn a sprocket handwheel for opening and shutting piping valves. When replacing or altering the length of an existing handwheel sprocket chain, a standard handwheel sprocket chain link is replaced with the present invention. This allows for additional link replacements or removal without having to compromise the strength integrity of a standard sprocket link through repeated "unbending" and bending back of the loop end of the standard sprocket link.

The sprocket chain master link operates by means of a detachable grasping end used to hold a link end portion of a standard handwheel sprocket chain link while the detachable bit end of the sprocket chain master link holds the loop end of a standard handwheel sprocket chain link. While attached to a handwheel sprocket chain, the sprocket chain master link rotates around a handwheel sprocket performing the same function as the attached standard handwheel sprocket chain links.

BRIEF DESCRIPTION OF THE DRAWINGS

A preferred embodiment of the present invention is described herein with reference to the drawings wherein.

DETAILED DESCRIPTION OF THE PREFERRED EMBODIMENT

Figure 1:
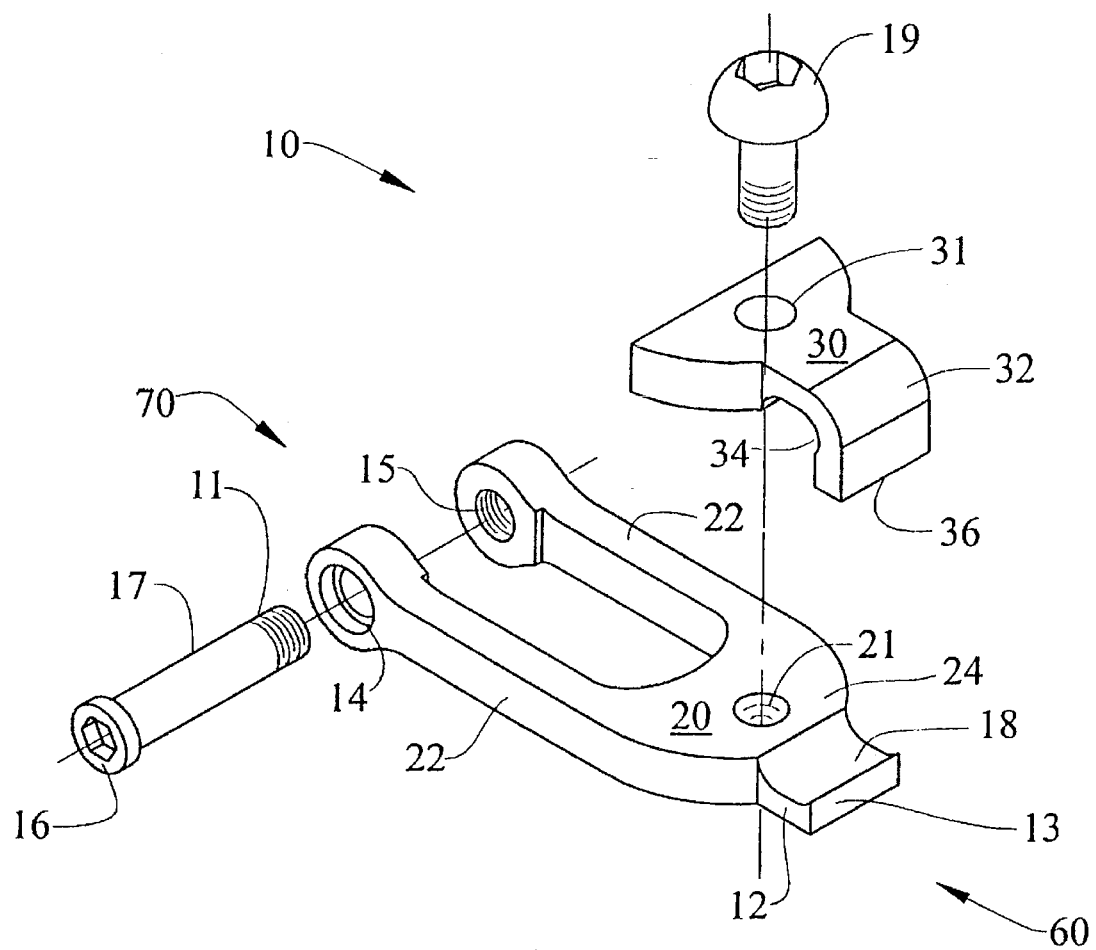
FIG. 1 of the drawings is a perspective view of the sprocket chain master link showing a break-away view of the various components of the device.

Referring to the drawings by numerals of reference, there is shown in FIGS. 1, 2, 3 and 4 the sprocket chain master link (10) used for linking opposite ends of a standard handwheel sprocket chain. The basic components of the sprocket chain master link (10) are revealed in FIG. 1 and include a shackle body member (20), a press member (30) and a shackle pin (17).

Referring to FIG. 1, the various elements of the sprocket chain master link (10) are presented in a break-away perspective view of the device. The main body of the sprocket chain master link (10) comprises a shackle body member

Figure 4:
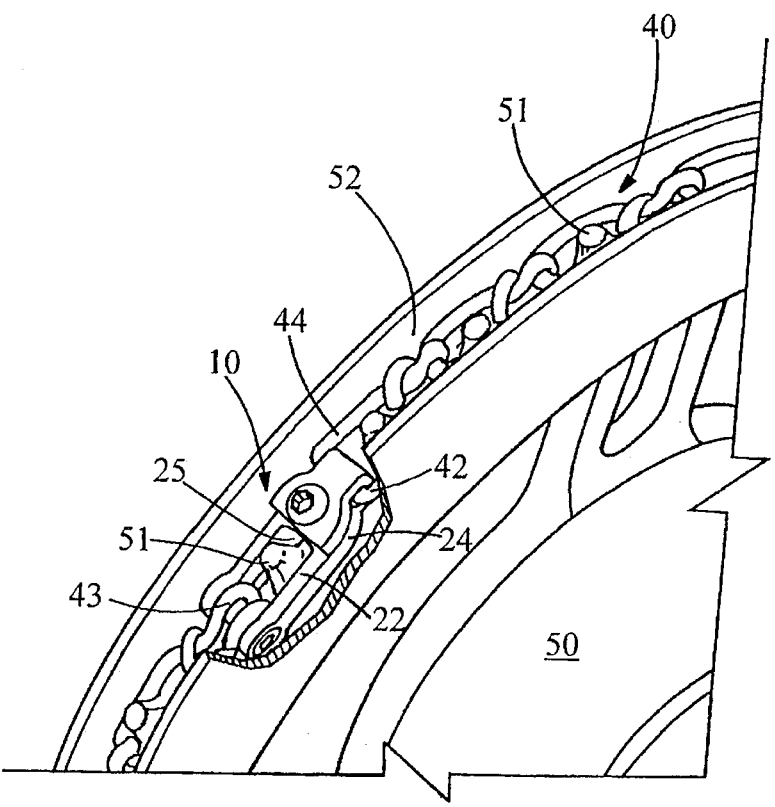
FIG. 4 of the drawings is a perspective view of the sprocket chain master link connecting opposite ends of a standard handwheel sprocket chain running along the arced perimeter of a standard handwheel.

(20) having a first and second shackle arm (22) extending from the main shackle head member (24). The first and second shackle arms (22) are designed to provide a gap or opening for the insertion of a sprocket tooth (51) of the sprocket handwheel (50) as shown in FIG. 4 of the drawings.

Figure 2:
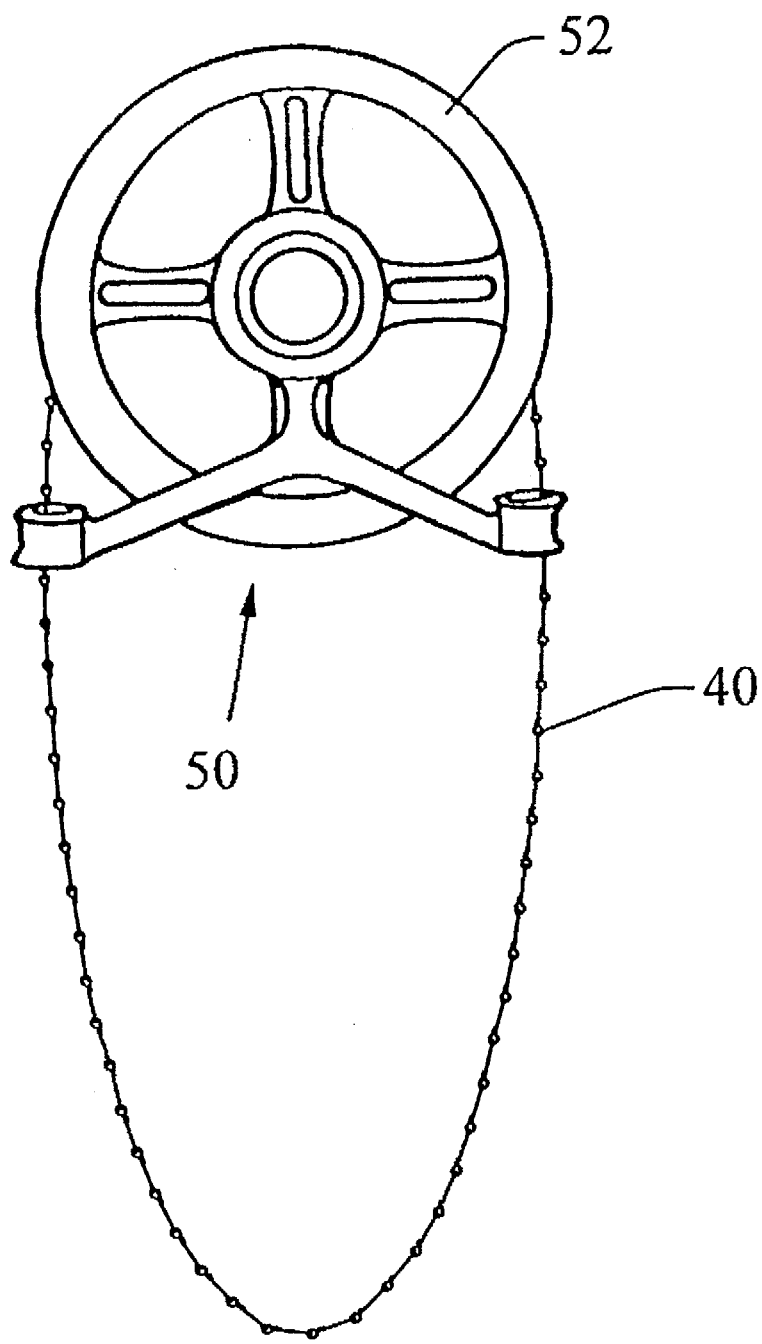
FIG. 2 of the drawings is a plan view of a standard sprocket handwheel and associated handwheel sprocket chain circumventing the handwheel.
Figure 3:
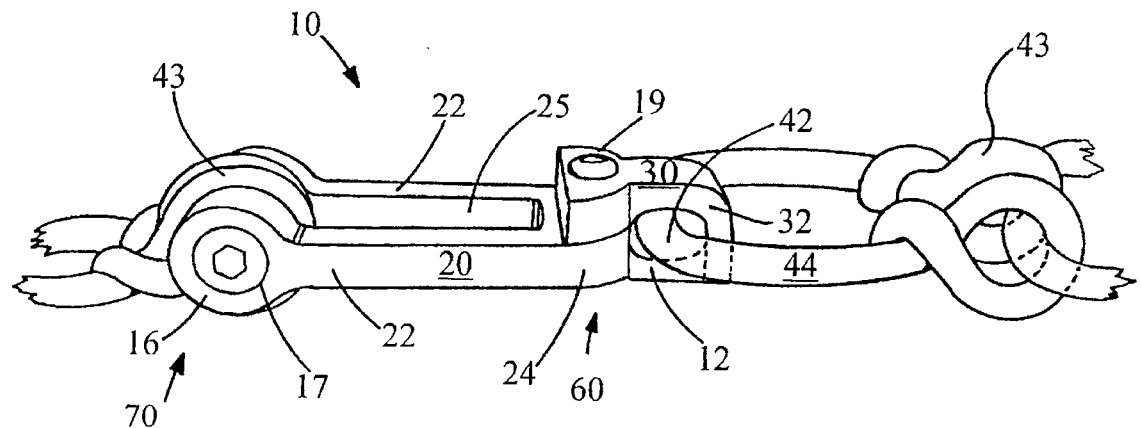
FIG. 3 of the drawings is a perspective view of the sprocket chain master link being attached to the two separate ends of a standard handwheel sprocket chain link.

Still referring to FIG. 1, the sprocket chain master link (10) has a means for holding opposite ends of a standard handwheel sprocket chain (40) as depicted in FIG. 2. The detachable grasping end (60) of the master link chain (10) comprises a press member (30) designed to grasp and secure the link end portion (42) of a standard handwheel sprocket chain link (44) as depicted in FIG. 3. This press member (30) is removably attached to the shackle body member (20) of the sprocket chain master link (10) by means of a threaded press screw (19) which compresses the press member (30) onto the shackle body member (20) by insertion through a press member boring (31) and screwing into a threaded shackle head member boring (21). Once in place, the bottom lip (36) of the forward cowl (32) of the press member (30) overlaps the front contact edge (13) or the shackle extension member (12). The link end portion (42) of a standard handwheel sprocket chain link (44) (as shown in FIG. 3) is held and secured in place by an interior cylindrical walled surface formed by the interior surface (34) of the forward cowl member (32) of the press member (30) and the top surface (18) of the shackle extension member (12).

Continuing with reference to FIG. 1, the detachable bit end (70) of the sprocket chain master link (10) is designed to secure a loop end (43) of standard handwheel sprocket chain link (44) as depicted in FIG. 3. This is accomplished by means of a shackle pin (17) that is inserted into a recessed shackle boring (14) and a threaded shackle boring (15) which has the effect of connecting the end pieces of the first and second shackle arms (22). The shackle pin (17) is secured into place by screwing the screw head end (16) of the shackle pin (17) into the threaded shackle boring (15) which is female threaded to receive and secure the threaded end (11) of the shackle pin (17). The screw head end (16) rests firmly inside the recessed shackle boring (14).

Referring to FIG. 2, the typical configuration of a sprocket handwheel (50) and associated handwheel sprocket chain (40) is depicted. The intended function of the handwheel sprocket chain (40) is to open or close a pipe valve by turning the sprocket handwheel (50). The handwheel sprocket chain (40) is guided along sprocket teeth (51) as depicted in FIG. 4 of the drawings. The handwheel sprocket chain (40) must possess sufficient flexibility between individual sprocket chain links to conform to the arced perimeter (52) of the sprocket handwheel (50). This flexibility characteristic and pivoting action between individual links must be preserved by the sprocket chain master link (10) shown in FIG. 1. The necessary pivoting action is allowed by ensuring sufficient linkage mobility at both the detachable grasping end (60) and the detachable bit end (70) of the sprocket chain master link as depicted in FIG. 1.

Referring to FIG. 3 of the drawings, the sprocket chain master link (10) is depicted attaching opposing ends of a handwheel sprocket chain (40) as shown in FIG. 2. The detachable grasping end (60) of the sprocket chain master link (10) holds the link end portion (42) of a standard handwheel sprocket chain link (44) by means of the press member (30) of the sprocket chain master link (10) being secured to the shackle head member (24). The link end portion (42) is provided with sufficient mobility between the forward cowl (32) of the press member (30) and the shackle extension member (12) of the shackle body member (20) to allow for pivoting at the linkage point.

Continuing reference to FIG. 3 of the drawings, the detachable bit end (70) of the sprocket chain master link (10) is shown with a loop end (43) of a standard handwheel sprocket chain link (44) secured to the shackle pin (17) of the sprocket chain master link (10). The shackle pin (17) is secured to the first and second shackle arms (22) by inserting the shackle pin (17) through the recessed shackle boring (14) and then screwing the shackle pin (17) into the threaded shackle boring (15) as depicted and discussed in FIG. 1. The shackle pin (17) has a diameter small enough to allow for rotational motion around the shackle pin (17) by the loop end (43) of a standard handwheel sprocket chain link (44). The open gap (25) depicted in FIG. 3 is formed by the boundaries of the first and second shackle arms (22), the shackle pin (17) and the shackle head member (24). This open gap (25) is necessary to allow the placement of a sprocket tooth (51) of a sprocket handwheel (50) as depicted in FIG. 4.

Referring to FIG. 4, the sprocket chain master link (10) is shown connecting opposite ends of a handwheel sprocket chain (40) and rotating around the arced perimeter (52) of a sprocket handwheel (50). A portion of the arced perimeter (52) of the sprocket wheel (50) is cut away to reveal the sprocket chain master link (10) in operation as it circumvents the sprocket wheel (50). The open gap (25) formed by the boundaries of the first and second shackle arms (22), the shackle pin (17) and the shackle head member (24) is sufficiently wide and long to rest on a sprocket tooth (51) without adversely effecting the linkage length of neighboring standard handwheel sprocket chain links (44). FIG. 4 demonstrates how the sprocket chain master link (10) assists with the normal function of a handwheel sprocket chain (40) which is to open or close a piping valve by turning a sprocket wheel (50) clockwise or counter-clockwise. A slight bend is revealed at the linkage point of both the detachable grasping end (60) and detachable bit end (70) of the sprocket chain master link (10). This mobility at each linkage end allows for smooth rotation about the arced perimeter (52) of the sprocket wheel (50).

A preferred embodiment of the present invention is described herein. It is to be understood, of course, that changes and modifications may be made in the embodiment without departing from the true scope and spirit of the present invention as defined by the appended claims.

That which is claimed is:

1. A sprocket chain master link used for coupling opposing ends of a handwheel sprocket chain, comprising in combination:

a. a detachable grasping end secured to a link end portion of a standard handwheel sprocket chain link providing pivoting mobility to said link end portion whereby a linkage axis created by said detachable grasping end of said sprocket chain master link and said link end portion of said standard handwheel sprocket chain link easily conforms to an arced perimeter of a sprocket handwheel, said detachable grasping end comprising:

i. a press member removably attached to said shackle head member;

ii. a forward cowl member extending from said press member over said shackle extension member of said shackle body member, said forward cowl member having a bottom lip contacting said front contact edge of said shackle extension member when said press member is attached to said shackle head member, said forward cowl member having an interior surface;

iii. a means for grasping said link end portion of said standard handwheel sprocket chain link; and iv. a means for removably attaching said press member to said shackle head member;

b. a shackle body member having a shackle head member and a first and second shackle arm, said first and second shackle arm being joined together at said shackle head member near said detachable grasping end of said sprocket chain master link, said shackle body member having an open gap through which a sprocket tooth of said sprocket handwheel inserts during rotation of said standard handwheel sprocket chain around said sprocket handwheel; and c. a detachable bit end of said sprocket chain master link connecting said first and second shackle arms opposite said grasping end of said sprocket chain master link, said detachable bit end comprising a shackle pin around which a loop end of said handwheel sprocket chain link circumvents.

2. The sprocket chain master link as claimed in claim 1 wherein said means for grasping said link end portion of said standard handwheel sprocket chain link comprises an interior cylindrical walled surface formed by said interior surface of said forward cowl member and said top surface of said shackle extension member, whereby said interior cylindrical walled surface holds said link end portion of said standard handwheel sprocket chain providing pivoting mobility around a link end axis extending through said interior cylindrical walled surface.

3. The sprocket chain master link as claimed in claim 1 wherein said means for removably attaching said press member to said shackle head member comprises a threaded press screw inserted first through a press member boring and a then through a shackle head member boring being female threaded to receive and secure said threaded press screw whereby said press member becomes compressed against said shackle head member.

4. A sprocket chain master link used for coupling opposing ends of a handwheel sprocket chain, comprising in combination:

a. a detachable grasping end secured to a link end portion of a standard handwheel sprocket chain link providing pivoting mobility to said link end portion whereby a linkage axis created by said detachable grasping end of said sprocket chain master link and said link end portion of said standard handwheel sprocket chain link easily conforms to an arced perimeter of a sprocket handwheel, said detachable grasping end comprising:

i. a press member removably attached to said shackle head member;

ii. a forward cowl member extending from said press member over said shackle extension member of said shackle body member, said forward cowl member having a bottom lip contacting said front contact edge of said shackle extension member when said press member is attached to said shackle head member, said forward cowl member having an interior surface;

iii. a means for grasping said link end portion of said standard handwheel sprocket chain link comprising an interior cylindrical walled surface formed by said interior surface of said forward cowl member and said top surface of said shackle extension member, whereby said interior cylindrical walled surface holds said link end portion of said standard handwheel sprocket chain providing pivoting mobility around a link end axis extending through said interior cylindrical walled surface; and iv. a means for removably attaching said press member to said shackle head member comprising a threaded press screw inserted first through a press member boring and a then through a shackle head member boring being female threaded to receive and secure said threaded press screw whereby said press member becomes compressed against said shackle head member;

b. a shackle body member having a shackle head member and a first and second shackle arm, said first and second shackle arm being joined together at said shackle head member near said detachable grasping end of said sprocket chain master link, said shackle body member having an open gap through which a sprocket tooth of said sprocket handwheel inserts during rotation of said standard handwheel sprocket chain around said sprocket handwheel, said shackle head member comprising a shackle extension member having a top surface and a front contact edge, said shackle extension member extending forward from said shackle head member directly opposite said first and second shackle arm and along a geometric plane shared by said first and second shackle arms; and c. a detachable bit end of said sprocket chain master link connecting said first and second shackle arms opposite said grasping end of said sprocket chain master link, said detachable bit end comprising a shackle pin around which a loop end of said handwheel sprocket chain link circumvents, said shackle pin comprising a screw head end and a threaded end, said shackle pin being secured to said first and second shackle arms at said detachable bit end of said sprocket chain master link by insertion of said threaded end through a recessed shackle boring and threaded shackle boring of said first and second shackle arms, said threaded shackle boring being female threaded to receive and secure said threaded end of said shackle pin.

5. The sprocket chain master link as claimed in claim 4 wherein said top surface of said shackle extension member and said interior surface of said forward cowl member of said detachable gasping end are arcuately shaped thereby facilitating pivoting mobility around said link end axis of said link end portion or said standard handwheel sprocket chain.

* * * * *